United States Patent
Werner et al.

(10) Patent No.: US 10,659,054 B2
(45) Date of Patent: May 19, 2020

(54) TRUSTED MONOTONIC COUNTER USING INTERNAL AND EXTERNAL NON-VOLATILE MEMORY

(71) Applicant: NXP B.V., Eindhoven (NL)

(72) Inventors: Achim Werner, Hamburg (DE); Vitaly Ocheretny, Hamburg (DE)

(73) Assignee: NXP B.V., Eindhoven (NL)

( * ) Notice: Subject to any disclaimer, the term of this patent is extended or adjusted under 35 U.S.C. 154(b) by 218 days.

(21) Appl. No.: 15/904,002

(22) Filed: Feb. 23, 2018

(65) Prior Publication Data
US 2019/0268001 A1    Aug. 29, 2019

(51) Int. Cl.
| H03K 21/38 | (2006.01) |
| G06F 1/26 | (2006.01) |
| G11C 17/14 | (2006.01) |
| G11C 17/18 | (2006.01) |
| G06F 21/51 | (2013.01) |

(52) U.S. Cl.
CPC ............. *H03K 21/38* (2013.01); *G06F 1/26* (2013.01); *G06F 21/51* (2013.01); *G11C 17/146* (2013.01); *G11C 17/18* (2013.01)

(58) Field of Classification Search
CPC ........ G06F 21/57; G06F 21/575; G06F 21/51; G06F 1/26; G11C 17/146; G11C 17/18; H03K 21/38
USPC ..................................................... 713/167
See application file for complete search history.

(56) References Cited

U.S. PATENT DOCUMENTS

| 6,836,853 | B1 * | 12/2004 | Dover | H03K 21/403 |
| | | | | 377/107 |
| 7,587,595 | B2 * | 9/2009 | Scarlata | G06F 21/53 |
| | | | | 713/167 |
| 8,588,756 | B2 | 11/2013 | Baldan | |
| 8,670,568 | B2 * | 3/2014 | Ibrahim | G06F 21/572 |
| | | | | 380/277 |
| 8,781,119 | B2 * | 7/2014 | Buhr | H04L 9/0869 |
| | | | | 380/46 |
| 9,465,933 | B2 | 10/2016 | Chhabra | |

(Continued)

OTHER PUBLICATIONS

Schellekens, Dries, Pim Tuyls, and Bart Preneel. "Embedded trusted computing with authenticated non-volatile memory." International Conference on Trusted Computing. Springer, Berlin, Heidelberg, 2008. (Year: 2008).*

(Continued)

*Primary Examiner* — Syed A Zaidi

(57) ABSTRACT

A device, including: an unsecure non-volatile memory; a secure device including: a processor; and a secure non-volatile memory; wherein the secure device is configured to: calculate a TMC value from an offset and a base value; store a TMC version value in the secure non-volatile memory and the insecure non-volatile memory, wherein the TMC version value is updated when TMC value is incremented the first time after the secure device is powered up; store the base value in the unsecure non-volatile memory; store the offset value in the unsecure non-volatile memory when the secure device is in a system power down state; store the offset value in the secure non-volatile memory when the secure device is in a rescue state; and store a TMC link value in the unsecure memory, wherein the TMC link value is based upon the base value and TMC version value stored in the unsecure memory.

20 Claims, 8 Drawing Sheets

(56) References Cited

U.S. PATENT DOCUMENTS

| | | | | |
|---|---|---|---|---|
| 2002/0087872 | A1* | 7/2002 | Wells | G06F 21/72 |
| | | | | 713/193 |
| 2003/0149854 | A1* | 8/2003 | Yoshino | G06F 12/1458 |
| | | | | 711/173 |
| 2006/0085845 | A1* | 4/2006 | Davis | G06F 21/31 |
| | | | | 726/6 |
| 2006/0143446 | A1* | 6/2006 | Frank | G06F 21/57 |
| | | | | 713/164 |
| 2009/0305687 | A1* | 12/2009 | Baldan | G06F 21/54 |
| | | | | 455/419 |
| 2010/0313056 | A1 | 12/2010 | Margolis et al. | |
| 2014/0013015 | A1* | 1/2014 | Chang | G06F 13/28 |
| | | | | 710/22 |
| 2014/0201607 | A1 | 7/2014 | Ashkenzai | |
| 2017/0034867 | A1* | 2/2017 | Oshida | H04L 12/0428 |
| 2018/0018288 | A1* | 1/2018 | Dewan | G06F 3/0622 |
| 2018/0212971 | A1* | 7/2018 | Costa | G06F 21/602 |

OTHER PUBLICATIONS

NPL Search (Year: 2019).*
NPL Search Results (Year: 2020).*
https://eprit.iact.org/2017/048.pdf (Rollback Protection for Trusted Execution).
projects.csail.mit.edu/tc/papes/cc-stc06.pdf (Virtual Monotonic Counters and Count-Limited Objects using a TPM without a Trusted OS).

* cited by examiner

| | MAXIMUM POWER CYCLES | MAXIMUM COUNTER VALUE (TRANSACTIONS) |
|---|---|---|
| COUNTER CONCEPT (128-KBIT OTP) | | |
| 32-BIT FULL WIDTH COUNTER (+ 6-BIT ECC) | 128*1024/(32+6) = 3449 | $2^{32}$ = 4.29E+09 |
| ALTERNATE TMC WITH 16-BIT OFFSET (+ 5-BIT ECC) | 128*1024/(3) = 43690* | 43690*$2^{16}$ = 2.86E+09 |
| ALTERNATE TMC WITH 24-BIT OFFSET (+ 5-BIT ECC) | 128*1024/(3) = 43690* | 43690*$2^{24}$ = 7.33E+11 |

FIG. 9

TRUSTED MONOTONIC COUNTER USING INTERNAL AND EXTERNAL NON-VOLATILE MEMORY

TECHNICAL FIELD

Various exemplary embodiments disclosed herein relate generally to a method and apparatus related to a trusted monotonic counter using internal and external non-volatile memory.

BACKGROUND

Various security protocols have been developed that use a monotonic counter. Such monotonic counters may be used to verify current messages and versions of data and software as well as preventing replay attacks.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a device, including: an unsecure non-volatile memory; a secure device including: a processor; and a secure non-volatile memory; wherein the secure device is configured to: calculate a trusted monotonic counter (TMC) value from an offset and a base value; store a TMC version value in the secure non-volatile memory and the insecure non-volatile memory, wherein the TMC version value is updated when TMC value is incremented the first time after the secure device is powered up; store the base value in the unsecure non-volatile memory; store the offset value in the unsecure non-volatile memory when the secure device is in a system power down state; store the offset value in the secure non-volatile memory when the secure device is in a rescue state; and store a TMC link value in the unsecure memory, wherein the TMC link value is based upon the base value and TMC version value stored in the unsecure memory.

Various embodiments are described, further including: a rescue register; and a rescue power supply, wherein the rescue register and rescue power supply are used to store the offset value in the secure non-volatile memory when the secure device is in the rescue state.

Various embodiments are described, wherein the secure device is further configured to compare the TMC version value stored in the secure non-volatile memory with the TMC version value stored in the unsecure non-volatile memory.

Various embodiments are described, wherein the secure device is further configured to verify the TMC link value based upon the base value and TMC value stored in the unsecure non-volatile memory.

Various embodiments are described, wherein the secure device is further configured to restore the TMC base value during a power up state from the base value stored in the unsecure non-volatile memory and the offset value stored in the unsecure non-volatile memory when TMC link value is verified.

Various embodiments are described, wherein the secure device is further configured to restore the TMC base value during a power up state from the base value stored in the unsecure memory and the offset value stored in the secure non-volatile memory when TMC link value is verified.

Various embodiments are described, wherein the secure device is further configured to update the TMC value by incrementing the offset value.

Various embodiments are described, wherein the secure device is further configured to update the TMC link value during the system power down state.

Various embodiments are described, wherein the number of bits in the offset value is less than the number of bits of the TMC counter value.

Various embodiments are described, wherein the number of bits in the offset value is less than or equal to half the number of bits of the TMC counter value.

Various embodiments are described, wherein the TMC link value is a hash of the base value and TMC version value stored in the unsecure memory.

Various embodiments are described, wherein the TMC link value is a copy of the base value and TMC version value stored in the unsecure memory.

Further various embodiments relate to a device, including: an unsecure non-volatile memory; a secure device including: a processor; and a secure non-volatile memory; wherein the secure device is configured to: calculate a trusted monotonic counter (TMC) value from an offset and base value; store a TMC version value in the secure non-volatile memory and the insecure non-volatile memory, wherein the TMC version value is updated when TMC value is incremented the first time after the secure device is powered up; store the base value in the unsecure memory; and store the offset value in the secure non-volatile memory.

Various embodiments are described, further including: a rescue register; and a rescue power supply, wherein the rescue register and rescue power supply are used to store the offset value in the secure non-volatile memory when the secure device is in a rescue state.

Various embodiments are described, wherein the secure device is further configured to compare the TMC version value stored in the secure non-volatile memory with the TMC version value stored in the unsecure non-volatile memory.

Various embodiments are described, wherein the secure device is further configured to restore the TMC base value during a power up state from the base value stored in the unsecure non-volatile memory and the offset value stored in the unsecure non-volatile memory.

Various embodiments are described, wherein the number of bits in the offset value is less than the number of bits of the TMC counter value.

Various embodiments are described, wherein the number of bits in the offset value is less than or equal to half the number of bits of the TMC counter value.

Various embodiments are described, wherein the secure device is further configured to update the TMC value by incrementing the offset value.

Various embodiments are described, wherein offset value is stored in the secure non-volatile memory when the secured device is in a power down state.

BRIEF DESCRIPTION OF THE DRAWINGS

In order to better understand various exemplary embodiments, reference is made to the accompanying drawings, wherein:

FIG. 9 is a table illustrating the maximum power cycles and maximum counter value for various TMC systems.

To facilitate understanding, identical reference numerals have been used to designate elements having substantially the same or similar structure and/or substantially the same or similar function.

DETAILED DESCRIPTION

Figure 1:
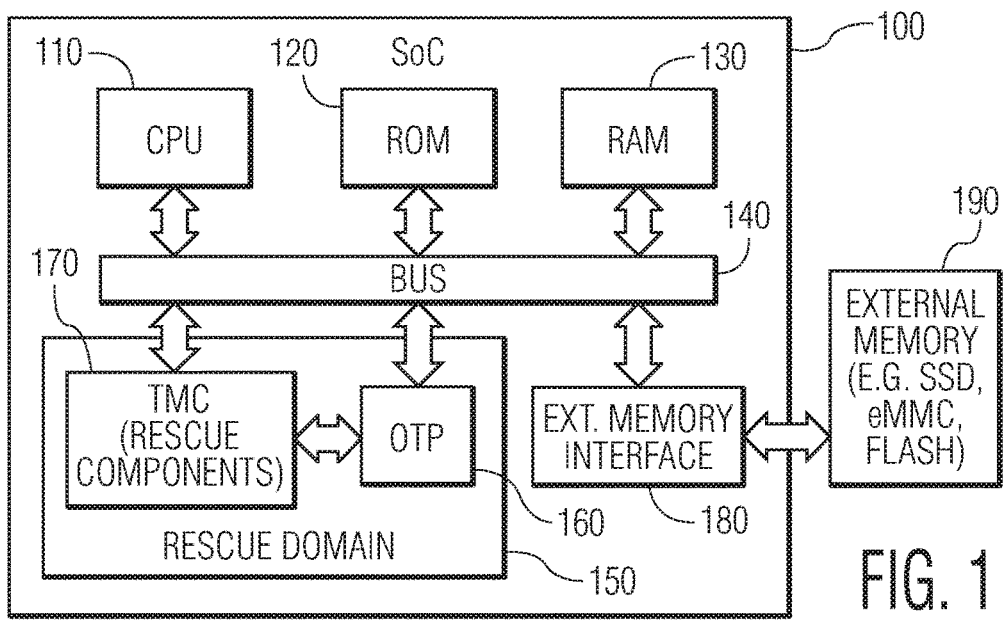
FIG. 1 illustrates a SoC that implements the TMC.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Electronic devices are often equipped with integrated circuits to offer an enhanced product functionality to the user. The integrated circuits can be a system-on-chip (SoC) semiconductor product with one or more processors, integrated writable and re-writable memory, various peripherals and interfaces, e.g., to connect to an external memory or to other resources.

A lot of applications which are loaded and run on those systems have a requirement that only up-to-date software shall be executable on the system. Also applications shall only process valid data which is not outdated. For example, old software code with a security bug that is executed on a system instead of the latest version of patched code may permit an adversary to attack the system. Another example is that for a payment transaction it is possible for an attacker to use an old transaction amount instead of the current transaction amount to allow an adversary to steal money or to manipulate an electronic wallet.

To distinguish different versions of software code and data (data will be further used as an example throughout the following description), the software code or data may be signed with a unique number. The result of this signing operation, which is called a hash value, is stored together with the data. This unique hash value is provided by the system. When the data is read, the data is verified for "freshness" wherein an actual hash value is computed using the current unique number in the system and compared with the stored hash value. This prevents attackers from rolling back the data. A monotonic counter may be used to generate the unique numbers with the following requirement that generated values must never be repeated.

For a SoC with a limited internal non-volatile memory it is a challenge to store all unique numbers internally because the number of unique numbers needed over the whole product life cycle can be high. For example, an advanced manufacturing process technology often is just able to implement a certain amount of non-volatile memory on the device itself with limited write cycles, for example, One Time Programmable (OTP) or Multi Time Programmable (MTP) cells. If a SoC implemented using such a manufacturing technology is equipped with 64-kBit OTP array, a maximum of 65535 unique numbers may be stored in OTP under the assumption that 1 bit is used per value.

To overcome the limitations of internal memory, SoCs may be equipped with interfaces allowing the SoC to connect to an external memory (e.g., FLASH, EEPROM, SSD, eMMC). However, this introduces a security issue because an adversary can easily access or manipulate data in an external memory. For example, the data may be probed at an external memory interface or the whole external memory may be replaced by another one. Hence, the data stored in the external memory has to be protected with respect to its integrity, confidentiality, and authenticity. This also would apply to monotonic counter values (i.e., unique numbers) when storing them to external memory. Thus, additional protection will be required to prevent external data and a corresponding monotonic counter value from being replaced without being detected.

A trusted monotonic counter system (TMC) will be described below that efficiently uses limited internal memory and external memory to generate a significant number of unique numbers in comparison to an approach of just storing each unique number in the internal memory of the SoC. Accordingly, the TMC system enables data rollback protection.

There are different approaches available for SoCs to create a rollback protection based on a Trusted Monotonic Counter, for example, with an external smart card (see U.S. Patent Publication No. 2014/0013015) or using a remote setup for firmware updates via a cloud system (see U.S. Pat. No. 8,588,756). All these approaches have some limitations, for example, they work only for special applications and the updates are only possible under special circumstances. The TMC system described herein allows for a trusted monotonic counter for a SoC with high count values using internal and external non-volatile memory and that works offline.

The TMC system with an SoC with limited on-chip non-volatile memory (e.g., OTP or MTP) and an interface to at least one external re-writeable memory is described below that has the following features: high maximum counter values; and efficient usage of internal (i.e., on-chip) non-volatile memory to improve counter life. These features may be accomplished by reducing the number of bits to be stored and only storing bits to the OTP when it is really required, such as if the power supply is removed. Further, the TMC system may have to accommodate power cycles and sudden loss of power (e.g., power removal by an attacker just when a version number update occurs.)

FIG. 1 illustrates a SoC that implements the TMC as described below. The SoC 100 may include a CPU 110, ROM 120, RAM 130, bus 140, rescue domain 150, and external memory interface 180. The CPU 110 provides the processing capability of the SoC 100 and may be any type of processor that provides the ability to carry out the processing tasks of the SoC 100. The ROM 120 is a read only memory that provides software code and data for the operation of the SoC 100. RAM 130 is random access memory that is used by the CPU 110 to carry out processing functions of the SoC 100. The bus 140 interconnects and facilitates communication between the various components of the SoC 100. The external memory interface 180 provides a communication and physical interface with an external memory 190. The external memory may be any type of non-volatile memory, such as for example, a solid-state disk (SSD), flash memory, embedded MultiMediaCard (eMMC), etc. Also, the external memory interface maybe establish a way to connect the SoC to a cloud storage.

The rescue domain 160 may include TMC 170 and OTP 160. The OTP 160 is an internal non-volatile memory in the SoC 100. It is limited in size and number of possible write cycles (namely, an OTP cell can be written only once). While the OTP 150 is used as an example of the non-volatile memory used in the rescue domain 150, the OTP may be replaced by any type of internal non-volatile memory, and it may also re-writeable as well, for example, MTP. The TMC 170 may include rescue components such as a rescue register and an additional emergency power supply, which is available if the main power supply is off as well as other components to carry out the TMC functions.

As will be described below, the rescue domain 150 is used for secure handling and storing of an offset value in the SoC, for example, in case of an attack on the main power supply.

The TMC 170 may generate unique numbers on demand (e.g., from OS or an authorized application) which will never be repeated again by incrementing/decrementing its actual value. Multiple TMCs may be implemented, for example, to serve different applications.

Figure 2:
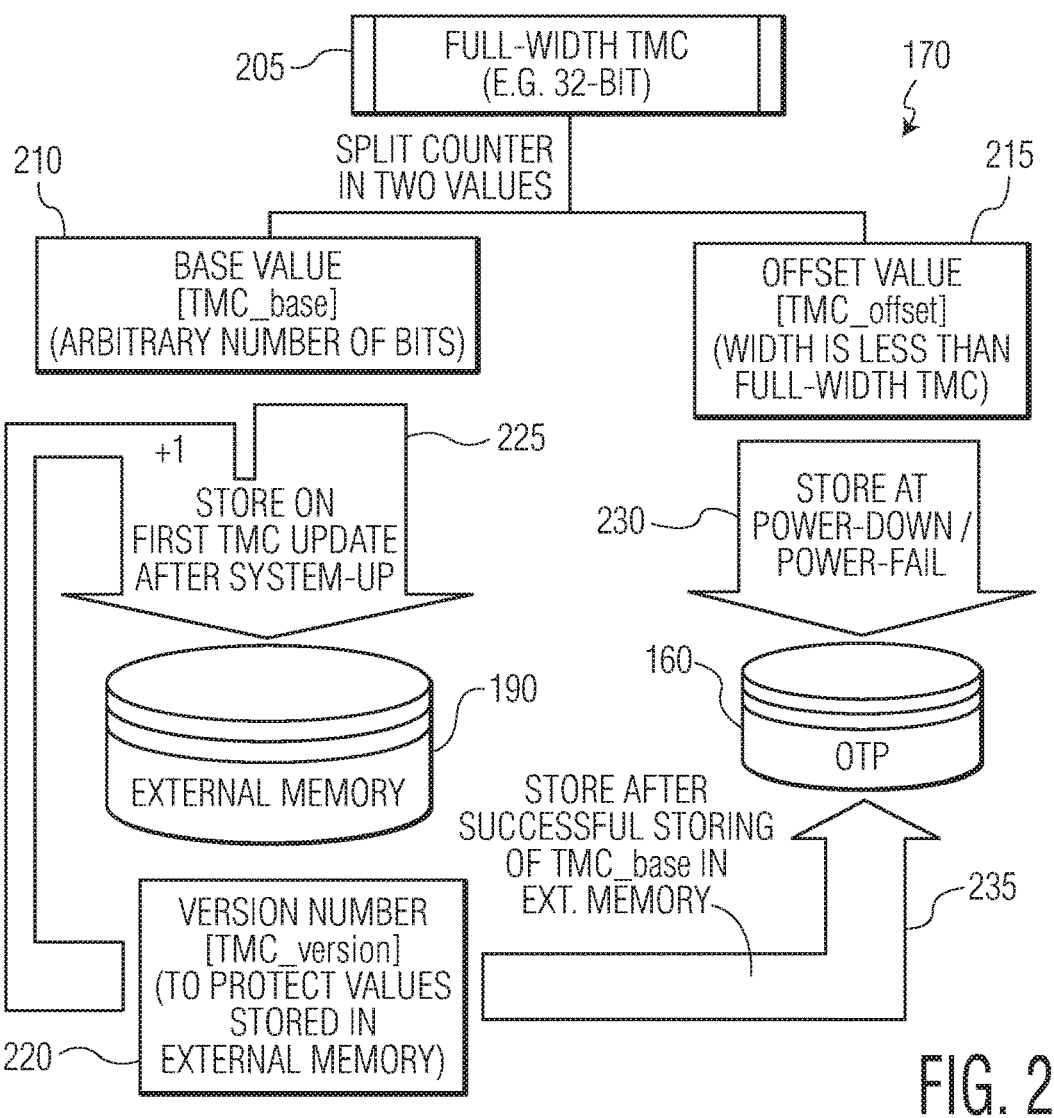
FIG. 2 illustrates a diagram of the TMC system.

FIG. 2 illustrates a diagram of the TMC system. The full-width TMC value 205 may be, for example, a 32-bit number (but other sizes are possible as well depending upon the application.) The TMC value 205 is split into two parts—a base value TMC_base 210 and offset value TMC_offset 215 and the TMC value 205 is calculated as a sum of TMC_base 210 and TMC_offset 215.

The base value TMC_base 210 may be an arbitrary number of bits. It is stored in external memory 190 if the TMC value 205 is updated first time after system startup 225. The base value stored in the external memory may be denoted as TMC_base_ref.

The offset value TMC_offset 215 is the value which is incremented to generate new a TMC value 205. TMC_offset 215 is stored in the OTP 160 when the SoC 100 is powered down and when the power fails 230. While incrementing is described in the embodiments herein, it noted that incrementing encompasses decrementing by incrementing by a negative value, such as for example, −1. The offset value in the OTP may be denoted as TMC_offset_OTP. To save OTP memory, the width of the programmed offset value TMC_offset_OTP may be less than the full-width TMC value 205.

The base value in external memory TMC_base_ref needs rollback protection because an attacker can relatively easy access it (e.g., via external memory interface). For this purpose, a version number TMC_version 220 is introduced. When TMC_base 210 is stored in external memory 225, the next value of TMC_version 220 (e.g., TMC_version+1) is stored 240 in the external memory 225 as well. The corresponding value is denoted as TMC_version_ref. If the store operation of the base value and version number was successful, TMC_version 220 is incremented to its next value and stored in OTP 235. To save OTP space, the TMC_version 220 may be encoded as a grey counter.

The offset value TMC_offset 215 and the logic responsible for writing it in the OTP 230 and the OTP 160 itself are located in the rescue domain 150. This ensures that the offset value will be stored in the OTP 160 when the normal power supply is not available (e.g., due to power attack when attacker removes it). Other TMC components may reside in the normal power domain.

In general, limited OTP memory is used using this embodiment to store the offset value TMC_offset 215 and version number TMC_version 220 which is more efficient than to store the full-width TMC value 205 in the OTP 160, for example, 16-bits for TMC_offset 215 plus 1-bit for TMC_version 220 instead of 32-bits for a full-width TMC value. The number of bits in the TMC_offset value 215 will be less than the number of bits in the TMC value 205 in order to save on storage in the OTP 160. The number of bits in the TMC_offset value 215 may less than or equal to half or a quarter or any other fraction of the number of bits in the TMC value 205.

Figure 3:
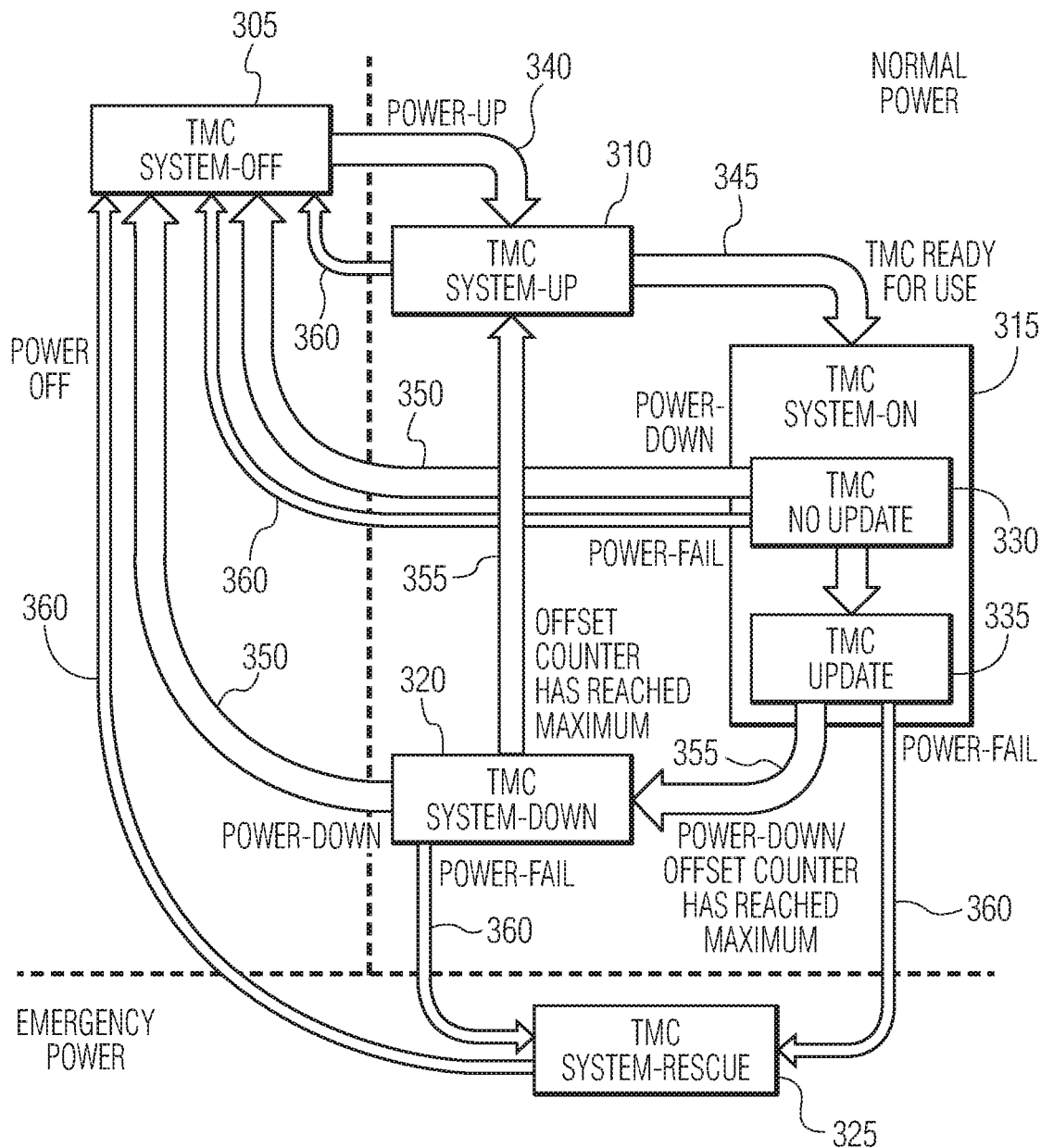
FIG. 3 illustrates a state diagram of the TMC system.

FIG. 3 illustrates a state diagram of the TMC system. TMC system include the following states: TMC system-off 305; TMC system-up 310; TMC system-on 315; TMC system-down 320; and TMC system-rescue 325.

In the TMC system-off state 305 no power is available. The TMC_base_ref value is stored in the external memory 190. The TMC_offset_OTP value and TMC_version 220 are stored in the OTP 160.

In the TMC system-up state 310 the TMC system is powering up. The TMC_base_ref value is read from external memory 190 and checked for freshness by comparing TMC_version_ref with TMC_version 220 from the OTP 160. Together with TMC_offset_OTP the base value TMC_base_ref is then used to restore last TMC value 205 which now becomes a new TMC_base value 210 for the current session. The TMC_offset value 215 for current session is set to 0.

In the TMC system-on state 315 the TMC value 205 may be used by an application. TMC value 205 is calculated as a sum of base value TMC_base 210 and offset value TMC_offset 215. The TMC system-on state 315 has two sub-states: the TMC no update state 330; and the TMC update state 335. The TMC no update state 330 is a sub-state in which the TMC value 205 has not been changed, but the TMC value 205 has only been used. The TMC update state 335 is a sub-state in which the TMC value 205 has been changed. Before a first update after the TMC system-up state 310, the current TMC value 205 and next version number TMC_version 220 are stored in external memory 190 as the new TMC_base_ref and TMC_version_ref. If this store operation was successful, the version number TMC_version in the OTP 160 is incremented. To increment the TMC value 205, the TMC_offset 215 value is incremented. If the store operation of TMC_base_ref and TMC_version_ref was not successful, it will be repeated again using the same values for them. This will prevent an attacker from collecting different values of TMC_base_ref and TMC_version_ref to reuse them for rollback attacks. If storing does not succeed after several trials, the TMC will be start recovery process (see below).

The TMC system-down state 320 is triggered if the TMC value 205 has been changed and power is down or offset counter has reached its maximum 355. In this case, the current TMC_offset 215 value is stored in the OTP 160 for use in the next session.

TMC system-rescue state 325 is reached if the TMC_offset value 215 has been changed and power fails 360 (e.g., due to attack). In this case, the current TMC_offset value 215 is stored in the OTP 160 using emergency power (e.g., provided by capacitor, battery or isolated protected supply).

Figure 4:
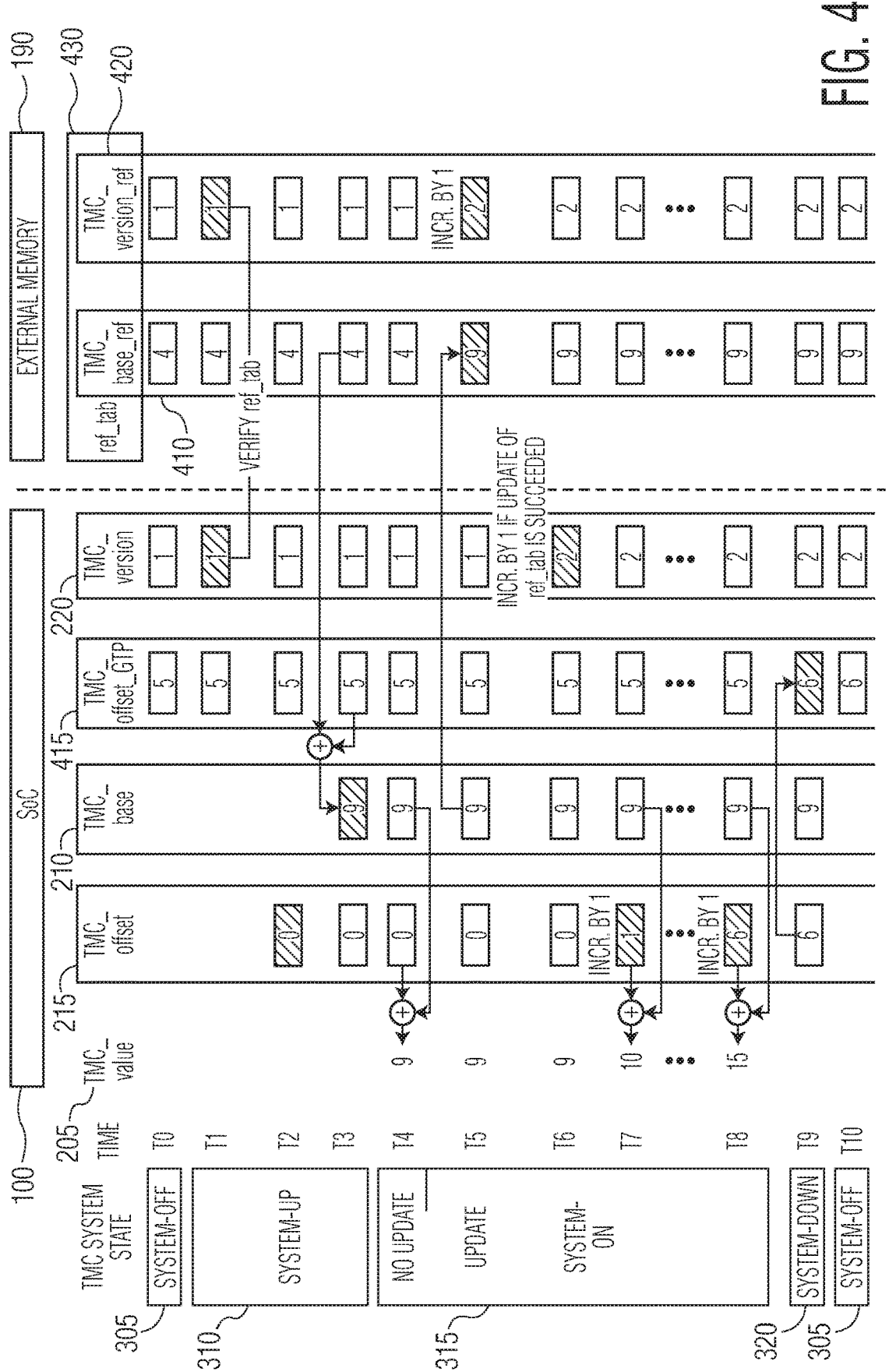
FIG. 4 illustrates an operation timeline of the TMC system.

FIG. 4 illustrates an operation timeline of the TMC system. The time progresses from time T0 to T10 as shown. Various stored values stored in the SoC 100 and the external memory 190 are also represented. The values in the SoC 100 of TMC_value 205, TMC_offset 215, TMC_base 210, TMC_offset_OTP 415, and TMC_version 220 are shown. The values in the external memory 190 of TMC_base_ref 410 and TMC_version_ref 420 are also shown. Along the left side the various states of the TMC system are shown at various times.

At time T0 the TMC system is in the system-off state 305. TMC_offset_OTP and TMC_version are stored in the OTP 160 and TMC_base_ref and TMC_version_ref are stored in external memory 190, and in this example these values are equal to 5, 1, 4 and 1 respectively.

At time T1 the TMC system enters the system-up state 310 where the TMC system starts up. The TMC system reads and authenticates the reference table ref_tab 430, which is a table stored in the external memory 190 that includes the values TMC_base_ref and TMC_version_ref. Next, the TMC system verifies that TMC_version==TMC_version_ref. If this is not the case, then an error condition is indicated and the system may be halted or a recovery process is begun, otherwise the TMC system proceeds. Such a recovery process may include clearing all data in the external memory. Then the TMC system calculates a new TMC_base value=TMC_version*TMC_offset max, which represents the highest possible TMC value in the past. The TMC system then writes this TMC_base value to external memory as new TMC_base_ref and restarts the system.

At time T2, the TMC system sets TMC_offset=0. At time T3 the TMC system restores the TMC_base value 210 by calculating TMC_base=TMC_base_ref+TMC_offset_OTP, which in this example is 4+5=9.

Next, the TMC transitions to the system-on state 315 at time T4. At time T4, the TMC system is now allowed to calculate the TMC_value 205 as TMC_value=TMC_base+TMC_offset, which in this example is 9+0=9.

At time T5, the TMC system requires a new TMC_value 205 the first time after the system-up state 310. But before TMC_offset is incremented, the ref_tab 430 in the external memory 190 has to be updated, so the TMC system saves restored TMC_base 210 as new TMC_base_ref 410 and writes incremented TMC_version_ref to the external memory 190, which the value that the new OTP version will become.

At time T6, the TMC system verifies that the ref_tab 430 has been correctly written. If the written TMC_base_ref value 410 is verified, then the TMC_version value 220 in the OTP 160 is incremented.

Now the general operation of the TMC system for further TMC_value updates will be described. At time T7, the TMC_offset value 215 is incremented. As a result a new TMC_value may be calculated as 1+9=10 in this example. At time T8 additional increments to TMC_offset 215 have occurred such that the TMC_value is now 15 in this example.

At time T9, the TMC system transitions into the system-down state 320. At this time, the TMC system stores TMC_offset to TMC_offset_OTP. Thus, the last TMC_offset value is saved in the OTP 160. Then at time T10, the TMC system transitions into the system-off state 305.

Figure 5:
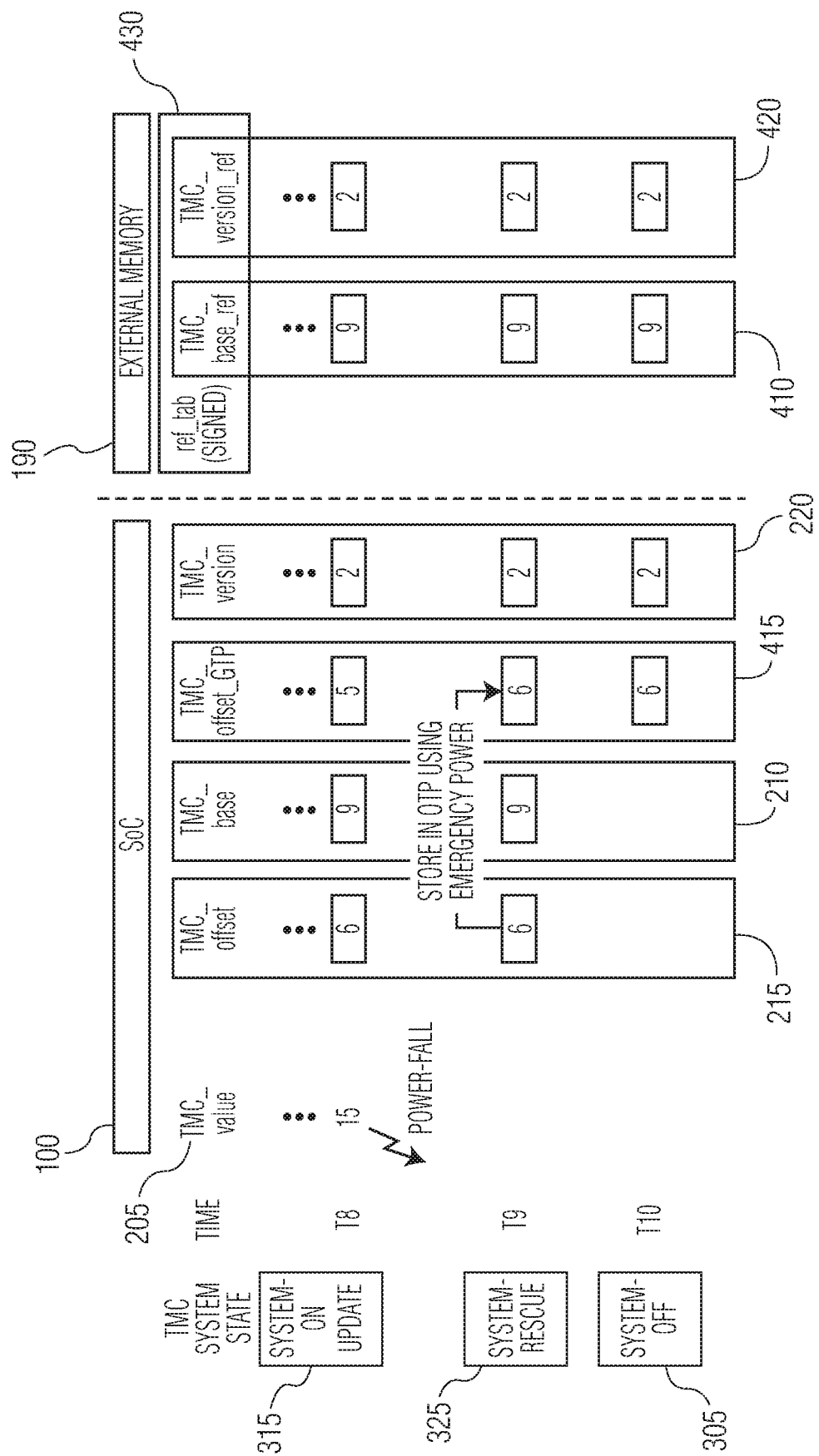
FIG. 5 illustrates an operation timeline of the TMC system when there is a power failure.

FIG. 5 illustrates an operation timeline of the TMC system when there is a power failure. In FIG. 5, the TMC system proceeds to time T8 as described above in FIG. 4. Then at time T9 a power failure occurs, and the TMC system enters the system-rescue state 325. When the power fails, the emergency power supply allows the TMC systems to write the TMC_offset value 215 into the OTP 160 to update the TMC_offset_OTP 415 value. At time T10 the TMC system then proceeds to the system-off state 305.

System-rescue state 325 is only triggered if normal power has failed and the TMC_value 205 has been changed, i.e., in the system-on state 315 if TMC_value 205 was changed or in the system-down state 320 to complete storing the TMC_offset value 215 in the OTP 160.

Figure 6:
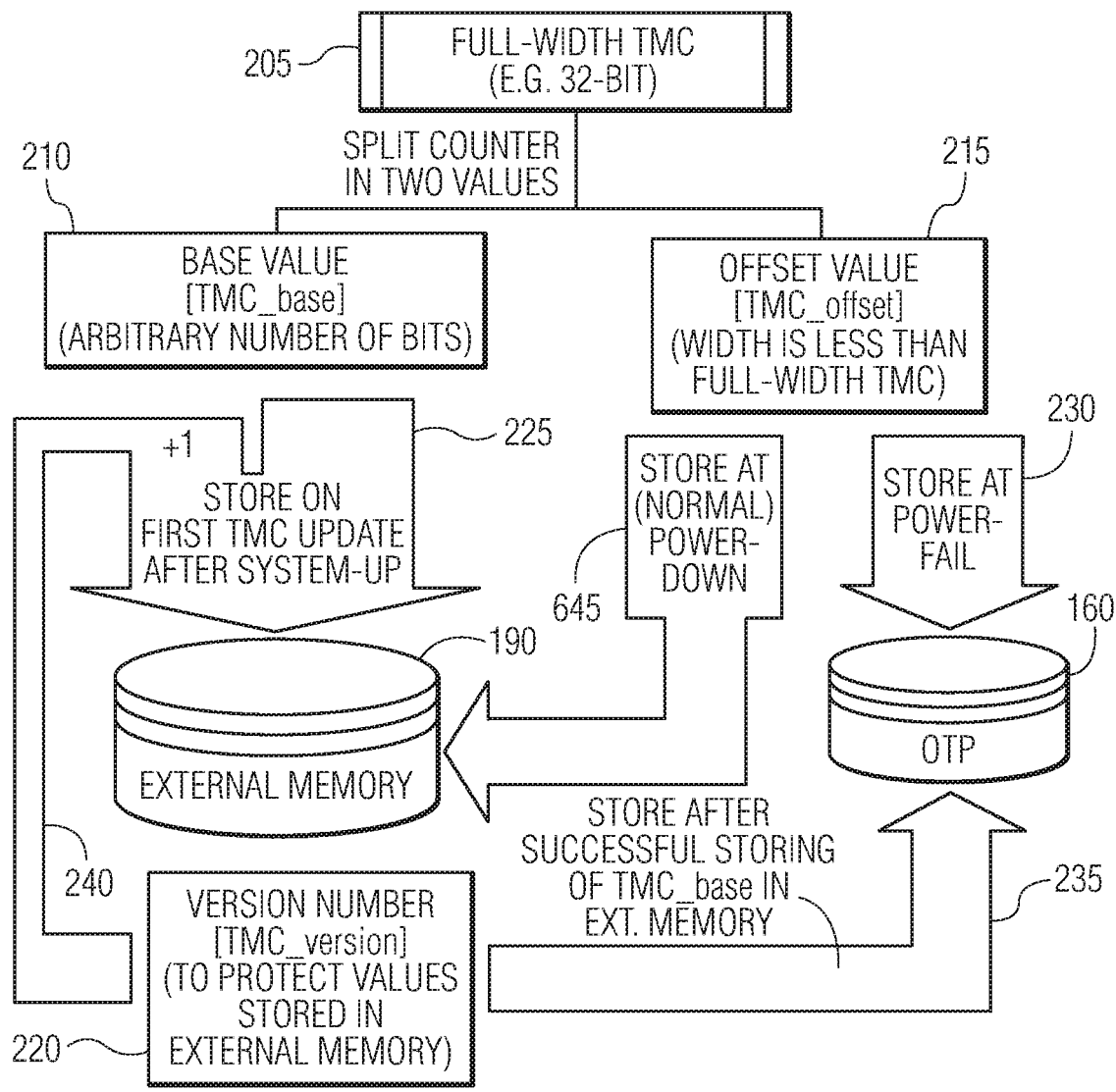
FIG. 6 illustrates a diagram of another embodiment of the TMC system.

The TMC system may be further optimized with respect to further reducing the usage of limited OTP memory 160. FIG. 6 illustrates a diagram of another embodiment of the TMC system. The alternate TMC system of FIG. 6 is the same as in FIG. 2, except that the offset value TMC_offset 215 is stored in the OTP 160 only when the power fails, and in the case of normal power-down, TMC_offset 215 is stored in the external memory 190.

Figure 7:
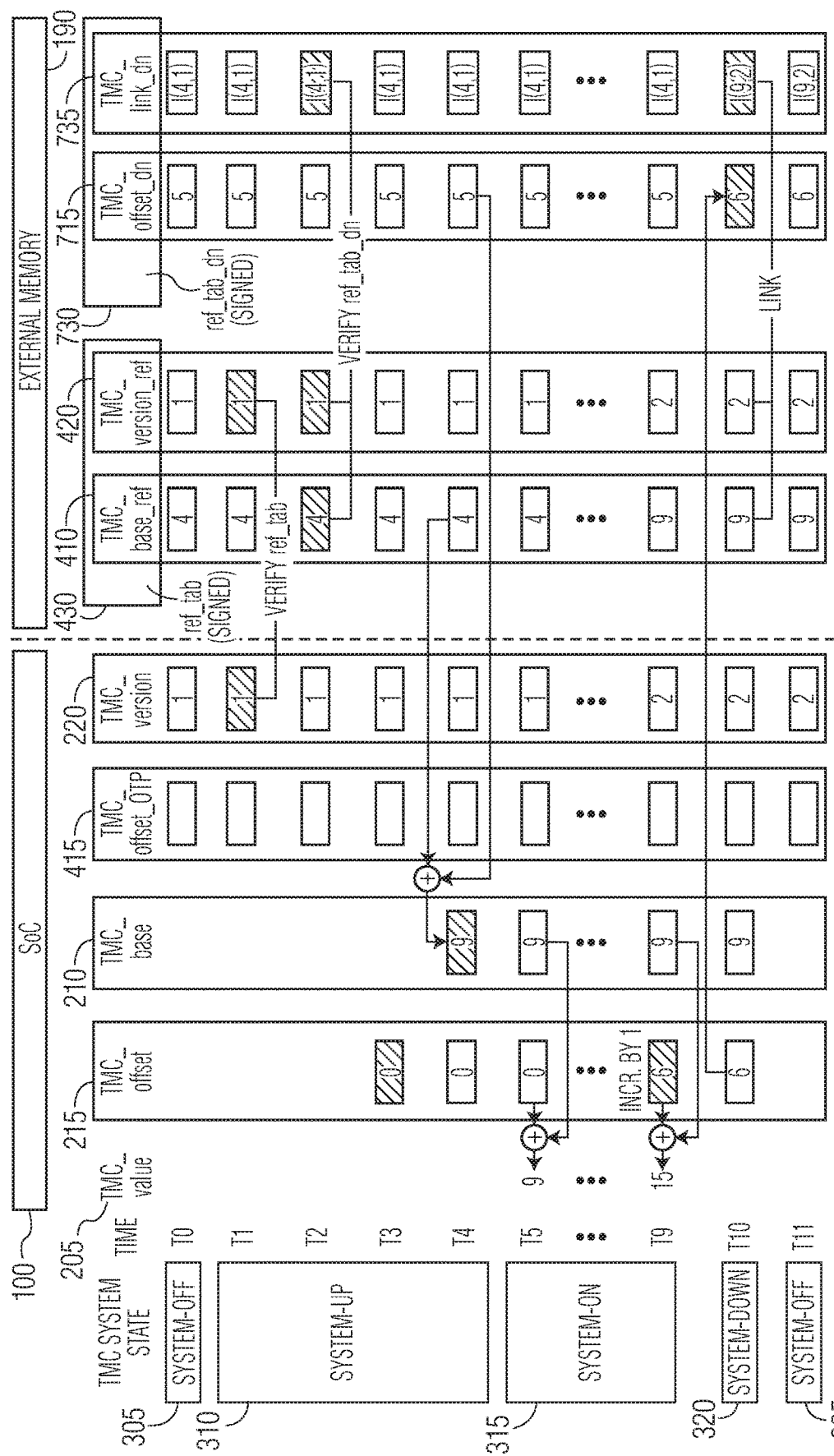
FIG. 7 illustrates an operation timeline of the alternate TMC system.

The offset value TMC_offset 215 stored in external memory is denoted as TMC_offset_dn 715 (see FIG. 7). This value TMC_offset_dn 715 also needs rollback protection. Therefore, TMC_offset_dn 735 is linked to the base value TMC_base_ref 410 and version number TMC_version_ref 420 in external memory 190 by the value TMC_link_dn 735. During the TMC system-up state 310, it is determined if TMC_offset_dn 715 corresponds to the TMC_base_ref 410 and TMC_version_ref 420 using TMC_link_dn 735. The TMC_link_dn 735 may simply be a duplicate of these values, a hash that can be checked for verification, or TMC_version plus an indication bit for power down. The TMC_offset_dn value 715 and TMC_link_dn value 735 are part of a table ref_tab_dn 730.

Now the various states of the optimized TMC system will be described. In the TMC system-off state 305 of the alternate TMC system, no power is available. The TMC_base_ref 410, TMC_offset_dn 715, TMC_version_ref 420, and TMC_link_dn 735 values are stored in the external memory 190. The TMC_version value 220 is stored in the OTP 160.

In the TMC system-up state 310 of the alternate TMC system, the TMC_base_ref value 410 is read from the external memory 190 and checked for freshness by comparing the TMC_version_ref value 420 from the external memory 190 with the TMC_version value 220 from the OTP 160. If the values match, then TMC_base_ref 410 and TMC_version_ref 220 are used to check the TMC_offset_dn value 715. If the TMC_offset_dn value 715 is verified, TMC_base_ref 410 and TMC_offset_dn 715 are used to restore last TMC value 205. If the TMC_offset_dn value 715 is not verified, the TMC_offset_OTP value 415 is used as the offset value. The restored last TMC value 205 then becomes the new TMC_base value 210 for current session. The TMC_offset value 215 for current session is also set to 0.

In the TMC system-on state 315 of the alternate TMC system, the TMC value 205 may be used by applications. The TMC value 205 is calculated as sum of base value TMC_base 210 and offset value TMC_offset 215. The TMC system-on state has two sub-states: TMC no update state 330; and TMC update state 335. The TMC no update state 330 is a sub-state in which the TMC value 205 has not been changed, but the TMC value 205 has only been used. The TMC update state 335 is a sub-state in which the TMC value 205 has been changed. Before a first update after the TMC system-up state 310, the current TMC value 205 and next version number TMC_version 220 are stored in external memory 190 as the new TMC_base_ref and TMC_version_ref. If this store operation was successful, the version number TMC_version 205 in the OTP 160 is incremented. To increment the TMC value 205, the TMC_offset 215 value is incremented.

The TMC system-down state 320 is triggered if the TMC_value 205 has been changed and power is down or offset counter has reached its maximum 355. In this case, the current TMC_offset 215 value is stored in the external memory 190 as TMC_offset_dn 715 for use in the next session. The TMC_offset_dn value 715 is also linked to the TMC_base_ref value 410 and TMC_version_ref value 420 in the external memory 190 using a link value TMC_link_dn 735.

TMC system-rescue state 325 is reached if the TMC_offset value 215 has been changed and power fails 360 (e.g., due to attack). In this case, the current TMC_offset value 315 is stored in the OTP 160 using emergency power (e.g., provided by capacitor).

FIG. 7 illustrates an operation timeline of the alternate TMC system. The timeline in FIG. 7 is very similar to that in FIG. 4. The time progresses from time T0 to T10 as shown. Various stored values stored in the SoC 100 and the external memory 190 are also represented as in FIG. 4. In the alternate TMC system, the offset value TMC_offset_dn 715 is stored in the external memory 190. Further, a second value TMC_link_dn 735 is stored in the external memory 190 that links to the TMC_base_ref value 410 and TMC_version_ref value 420.

At time T0, the alternate TMC system is in the system-off state 305. The TMC_version is stored in the OTP 160 and TMC_base_ref, TMC_version_ref, and TMC_offset_dn are stored in external memory 190, and in this example these values are equal to 1, 4, 1, and 5 respectively. Also TMC_link_dn 735 is stored in the external memory 190 with a value of 1(4,1).

At time T1, the alternate TMC system enters the system-up state 310 where the alternate TMC system starts up. The alternate TMC system reads and authenticates the reference table ref_tab 430. Next, the alternate TMC system verifies that TMC_version==TMC_version_ref. If this is not the case then an error condition is indicated and the system may be halted or a recovery process is begun, otherwise the alternate TMC system proceeds. Such a recovery process may include clearing all data in the external memory. Then the TMC system calculates a new TMC_base value=TMC_version*TMC_offset max, which represents the highest possible TMC value in the past. The TMC system then writes this TMC_base value to external memory as new TMC_base_ref and restarts the system.

At time T2, the alternate TMC system verifies the ref_tab_dn 730. The TMC_link_dn value 735 is checked against the TMC_base_ref value 410 and TMC_version_ref value 420. If the check is successful, then TMC_offset_dn 715 is used as stored as offset value, and if the check fails, TMC_offset_OTP is then used.

At time T3, the alternate TMC system sets TMC_offset=0. At time T4, the alternate TMC system restores the TMC_base value 210 by calculating=TMC_base=TMC_base_ref+TMC_offset_dn, which in this example is 4+5=9.

Next, the alternate TMC system transitions to the system-on state 315 at time T5. At time T5, the alternate TMC system is now allowed to calculate the TMC_value 205 as TMC_value=TMC_base+TMC_offset, which in this example is 9+0=9.

The steps at times T6-T8 are similar to the steps at times T5-T7 in FIG. 4.

At time T9 additional increments to TMC_offset 215 have occurred such that the TMC_value is now 15 in this example.

At time T10, the alternate TMC system transitions into the system-down state 320. At this time, the alternate TMC system stores TMC_offset 215 to the external memory as TMC_offset_dn 715. Also the TMC_link_dn value 735 is updated based upon the current TMC_base_ref value 410 and TMC_version_ref value 420. Thus, the last TMC_offset value 215 is saved in the external memory 190. Then at time T11, the alternate TMC system transitions into the system-off state 305.

Figure 8:
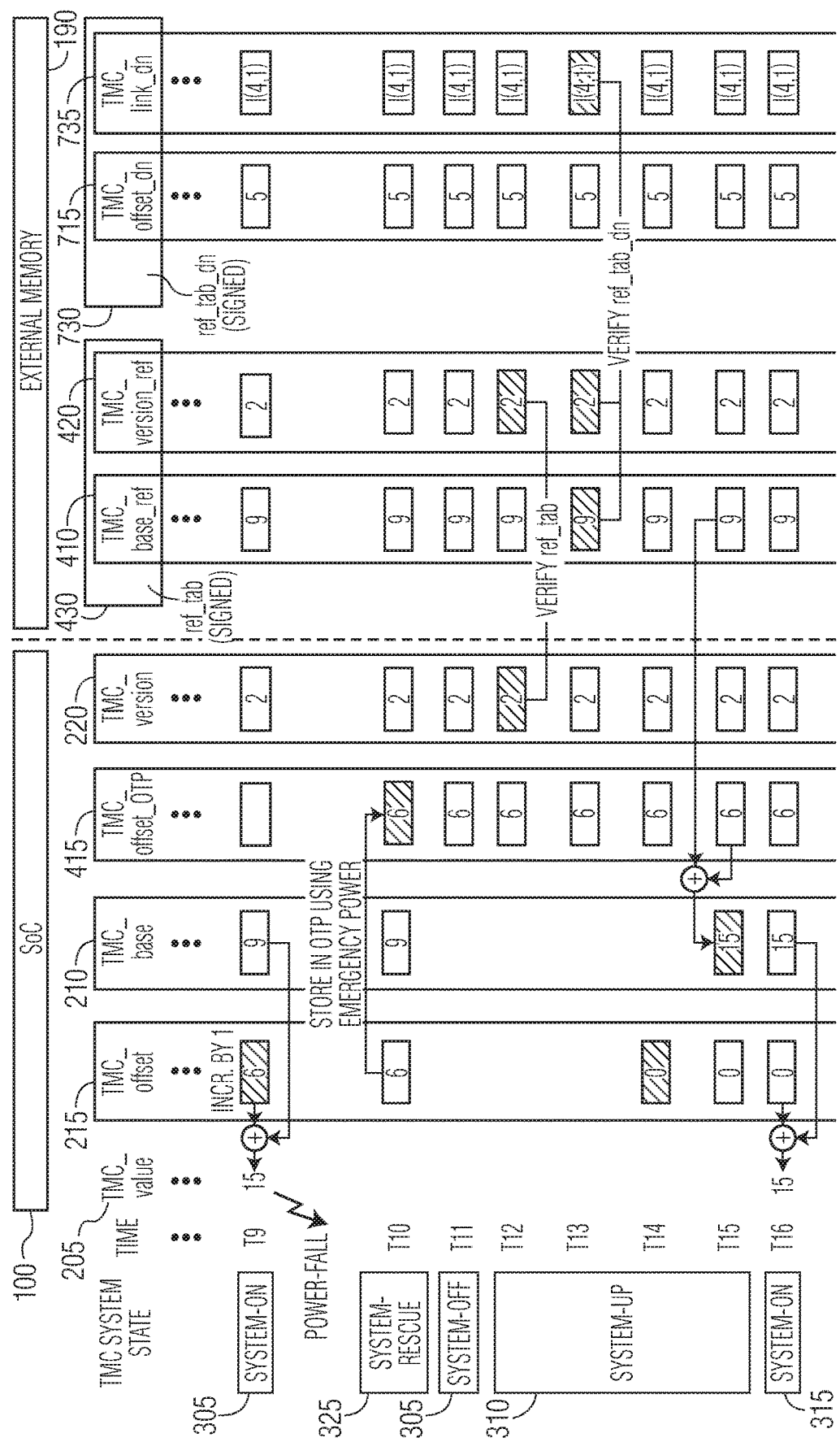
FIG. 8 illustrates an operation timeline of the alternate TMC system when there is a power failure.

FIG. 8 illustrates an operation timeline of the alternate TMC system when there is a power failure. In FIG. 8, the alternate TMC system proceeds to time T9 as described above in FIG. 7. Then at time T10 there is a power failure, and the TMC system enters the system-rescue state 325. At time T10, when the power fails, the emergency power supply allows the TMC systems to write the TMC_offset value 215 into the OTP 160 to update the TMC_offset_OTP 415 value. At time T11, the TMC system then proceeds to the system-off state 350. Note that the TMC_offset_dn value 715 and TMC_link_dn value 735 are not updated in this case and thus still contain the previous values.

Then at time T12, the alternate TMC system enters the system-up state 310 and verifies the TMC_version as at time T1. Next, at time T13, the alternate TMC system verifies the ref_tab_dn 730 as at time T2. In this situation the verification fails as the TMC_link_dn value 735 does not correspond to the current TMC_base_ref value 410 and the current TMC_version_ref value 420.

At time T15, the alternate TMC system restores the TMC_base value 210 using the TMC_offset_OTP value 415 instead of the TMC_offset_dn value 715 as was done at time T4.

At time T16 the alternate TMC system restores the TMC_value 205 by adding the TMC_offset value 215 to the TMC_base value 210.

Thus the alternate TMC system only stores the TMC_offset value 215 to the OTP 160 when power fails, otherwise during normal power down the alternate TMC system stores the TMC_offset value 215 to the external memory 190. This reduces the rate at which the OTP 160 is filled up and allows for increased maximum value of TMC_value 215 that may be achieved by the alternate TMC system.

In the embodiments described above, a single offset value was discussed. The embodiments may be expanded to include more than one offset as well. Such offsets may be combined, for example, via multiplication or addition to result in a computed offset that is then used to calculate the TMC value.

The embodiments described herein provide various benefits over prior art solutions. One metric to consider is the maximum power cycles, i.e., the number of possible system cycles before TMC reached end of its life time. Another metric is the maximum counter value which determines maximum number of transactions.

FIG. 9 is a table illustrating the maximum power cycles and maximum counter value for various TMC systems. The results of the table assume no power-failure, which means that only 3-bits of the TMC_version are written to the OTP at power cycles. The 3-bits include redundancy required for reliable and safe read of the stored TMC_version value. In the examples above, only 1-bit was used. The OTP has a storage capacity of 128 kbit. The first example TMC system uses a straight forward 32-bit full width counter with a 6-bit ECC in the OTP. In a normal system cycle the counter is stored in the OTP. This leads to 3449 maximum power cycles and to a maximum counter value of $2^{32}=4.29\times10^9$. In the second TMC system, the alternate embodiment of the TMC system is used with a 16-bit offset and a 5-bit ECC. In a normal system cycle the TMC_offset value is stored in the external memory and the TMC_version is a 3-bit value stored in the OTP. This results in 43690 maximum power cycles and a maximum counter value of $43690*2^{16}=2.86\times 10^9$. In the third TMC system, the alternate embodiment of the TMC system is used with a 24-bit offset and a 5-bit ECC. In a normal system cycle the TMC_offset value is stored in the external memory and the TMC_version is a 3-bit value stored in the OTP. This results in 43690 maximum power cycles and a maximum counter value of $43690*2^{24}=7.33\times 10^{11}$.

Thus in comparison to the full width TMC fewer OTP cells are required to store the offset and a larger number of maximum power cycles is possible. This also means less power is needed for emergency writes and can lead to a smaller emergency power supply. For systems that require a large number of transactions, the width of the offset can be adjusted to achieve better trade-off between the maximum number of transactions and required emergency power supply. Also the specific configuration may be set by software that determines the offset width depending upon system requirements. This allows for a single SoC to be used in various settings with various requirements.

The embodiments described herein represent an improvement in the technology of secure transactions and data exchanges where a TMC is used to prevent playback attacks. As shown above, the embodiments describe herein may provide various benefits and flexibility in systems using a TMC and limited memory.

The methods described above may be implemented in software which includes instructions for execution by a processor stored on a non-transitory machine-readable storage medium. The processor may include a memory that stores the instructions for execution by the processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A device, comprising:
an unsecure non-volatile memory;
a secure device including:
a processor; and
a secure non-volatile memory;
wherein the secure device is configured to:
calculate a trusted monotonic counter (TMC) value from an offset and a base value;
store a TMC version value in the secure non-volatile memory and the unsecure non-volatile memory, wherein the TMC version value is updated when the TMC value is incremented the first time after the secure device is powered up;
store the base value in the unsecure non-volatile memory;
store the offset value in the unsecure non-volatile memory when the secure device is in a system power down state;
store the offset value in the secure non-volatile memory when the secure device is in a rescue state, wherein the rescue state is reached in response to secure device being in the system power down state; and
store a TMC link value in the unsecure memory, wherein the TMC link value is based upon the base value and TMC version value stored in the unsecure memory, wherein the secure non-volatile memory is more efficiently used and rollback protection is provided.

2. The device of claim 1, further comprising:
a rescue register; and
a rescue power supply,
wherein the rescue register and rescue power supply are used to store the offset value in the secure non-volatile memory when the secure device is in the rescue state.

3. The device of claim 1, wherein the secure device is further configured to compare the TMC version value stored in the secure non-volatile memory with the TMC version value stored in the unsecure non-volatile memory.

4. The device of claim 1, wherein the secure device is further configured to verify the TMC link value based upon the base value and TMC value stored in the unsecure non-volatile memory.

5. The device of claim 4, wherein the secure device is further configured to restore the TMC base value during a power up state from the base value stored in the unsecure non-volatile memory and the offset value stored in the unsecure non-volatile memory when TMC link value is verified.

6. The device of claim 4, wherein the secure device is further configured to restore the TMC base value during a power up state from the base value stored in the unsecure memory and the offset value stored in the secure non-volatile memory when TMC link value is verified.

7. The device of claim 1, wherein the secure device is further configured to update the TMC value by incrementing the offset value.

8. The device of claim 1, wherein the secure device is further configured to update the TMC link value during the system power down state.

9. The device of claim 1, wherein the number of bits in the offset value is less than the number of bits of the TMC counter value.

10. The device of claim 1, wherein the number of bits in the offset value is less than or equal to half the number of bits of the TMC counter value.

11. The device of claim 1, wherein the TMC link value is a hash of the base value and TMC version value stored in the unsecure memory.

12. The device of claim 1, wherein the TMC link value is a copy of the base value and TMC version value stored in the unsecure memory.

13. A device, comprising:
an unsecure non-volatile memory;
a secure device including:
a processor; and
a secure non-volatile memory;
wherein the secure device is configured to:
calculate a trusted monotonic counter (TMC) value from an offset and base value;
store a TMC version value in the secure non-volatile memory and the unsecure non-volatile memory, wherein the TMC version value is updated when the TMC value is incremented the first time after the secure device is powered up;
store the base value in the unsecure memory; and
store the offset value in the secure non-volatile memory when power has failed in the secure device, wherein the secure non-volatile memory is more efficiently used and rollback protection is provided.

14. The device of claim 13, further comprising:
a rescue register; and
a rescue power supply,
wherein the rescue register and rescue power supply are used to store the offset value in the secure non-volatile memory when the secure device is in a rescue state in response to the power failure.

15. The device of claim 13, wherein the secure device is further configured to compare the TMC version value stored in the secure non-volatile memory with the TMC version value stored in the unsecure non-volatile memory.

16. The device of claim 13, wherein the secure device is further configured to restore the TMC base value during a power up state from the base value stored in the unsecure non-volatile memory and the offset value stored in the unsecure non-volatile memory.

17. The device of claim 13, wherein the number of bits in the offset value is less than the number of bits of the TMC counter value.

18. The device of claim 13, wherein the number of bits in the offset value is less than or equal to half the number of bits of the TMC counter value.

19. The device of claim 13, wherein the secure device is further configured to update the TMC value by incrementing the offset value.

20. The device of claim 13, wherein offset value is stored in the secure non-volatile memory when the secured device is in a power down state.

* * * * *